US006483214B1

United States Patent
Oelsch

(10) Patent No.: US 6,483,214 B1
(45) Date of Patent: Nov. 19, 2002

(54) SPINDLE MOTOR FOR DRIVING HARD DISK DRIVES WITH SEALING CONTACTING SYSTEM FOR THE STATOR WINDING TERMINAL

(75) Inventor: Jurgen Oelsch, Hohenroth (DE)

(73) Assignee: Precision Motors Deutsche Minebea GmbH, Villingen-Schwenningen (DE)

( * ) Notice: Subject to any disclaimer, the term of this patent is extended or adjusted under 35 U.S.C. 154(b) by 77 days.

(21) Appl. No.: 09/710,336

(22) Filed: Nov. 9, 2000

(30) Foreign Application Priority Data

Nov. 16, 1999 (DE) .......................... 199 54 962

(51) Int. Cl.[7] .............................................. H02K 11/00
(52) U.S. Cl. ...................... 310/68 R; 310/67 R; 310/45
(58) Field of Search .................... 310/68 R, 71, 310/85, 67 R, 45; 174/254, 35 R, 35 GC; 361/749, 750, 751, 816, 818; 360/99.08, 99.04, 98.07

(56) References Cited

U.S. PATENT DOCUMENTS

| 3,602,748 | A | * | 8/1971 | Locke | 310/71 |
|---|---|---|---|---|---|
| 4,104,484 | A | * | 8/1978 | Ijlstra et al. | 174/151 |
| 4,626,721 | A | * | 12/1986 | Ouchi | 310/71 |
| 5,061,868 | A | * | 10/1991 | Iwazaki et al. | 310/67 R |
| 5,064,377 | A | * | 11/1991 | Wood | 361/749 |
| 5,177,650 | A | * | 1/1993 | Jabbari et al. | 360/99.08 |
| 5,214,326 | A | * | 5/1993 | Yonei | 310/67 R |
| 5,216,304 | A | * | 6/1993 | Ohta | 310/67 R |
| 5,256,922 | A | * | 10/1993 | Tanaka et al. | 310/71 |
| 5,661,352 | A | * | 8/1997 | Oguchi et al. | 310/71 |

* cited by examiner

Primary Examiner—Tran Nguyen
(74) Attorney, Agent, or Firm—Cooper & Dunham LLP

(57) ABSTRACT

The present invention concerns a sealing contacting system for the stator windings of spindle motors, which are provided for installation in the base plate of hard disk drives. The present invention has a peripheral, self-contained sealing surface free from interruptions, which avoids jumps or unevenness in the peripheral sealing region, eliminating previously unavoidable radial capillary gaps, so that hermetic sealing is produced between the region of the hard disks formed from clean space and the external ambient region.

7 Claims, 3 Drawing Sheets

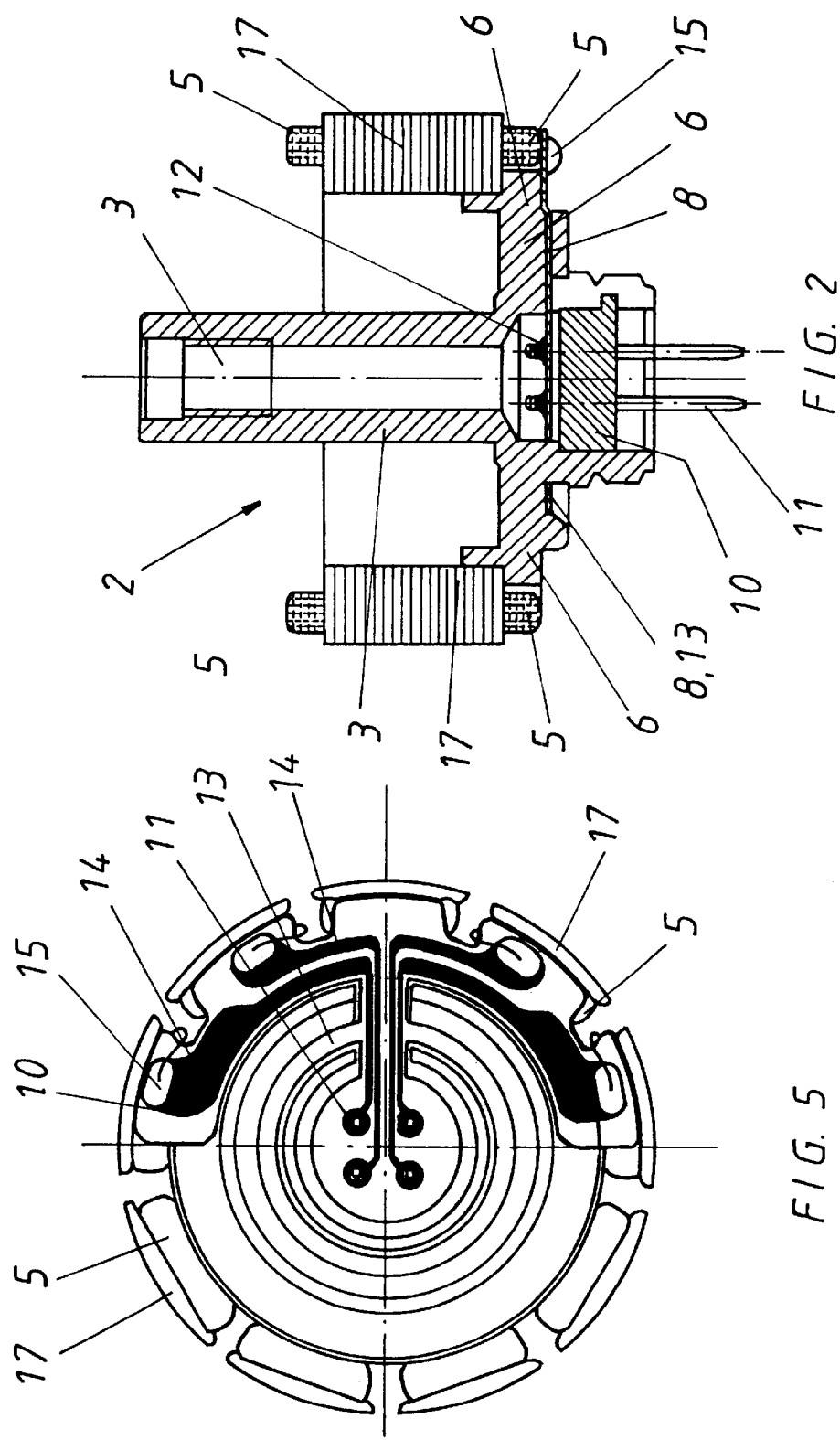

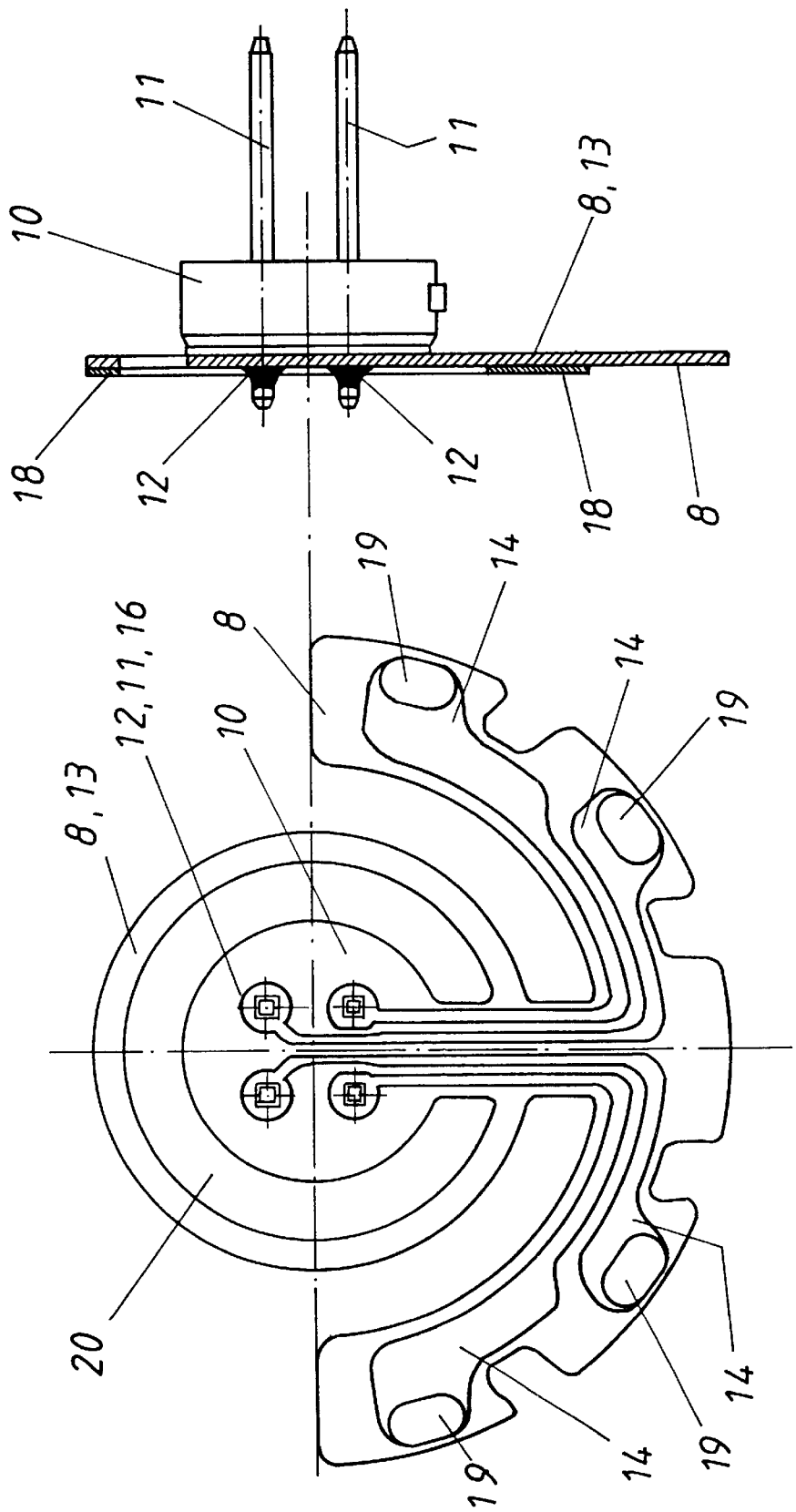

SPINDLE MOTOR FOR DRIVING HARD DISK DRIVES WITH SEALING CONTACTING SYSTEM FOR THE STATOR WINDING TERMINAL

BACKGROUND OF THE INVENTION

The present invention concerns a contacting system which seals, without interruption, the stator winding terminal in spindle motors.

Spindle motors are mainly used for driving hard disk drives. Due to the demand for higher and higher storage densities for hard disk drives, endeavours are constantly being made to make their geometrical dimensions increasingly smaller and more compact. Further development of hard disk drives therefore also results in lower and lower flight heights of the read and write heads over the rotating storage medium. At the same time the access times must be reduced to obtain a quicker and higher data throughput, and this in turn requires higher speeds for the hard disk drives. To avoid read and write errors due to head crashes, that is, the read and write heads touching or catching on the hard disk, the requirements of the degree of cleanness for the atmosphere enclosed within the drive are getting higher and higher.

From the need to protect storage media and read/write heads from contamination and mechanical damage, results the demand for a higher and higher degree of cleanness of the air in the drive. This means that both the number and size of permitted particles per unit of volume as a measurable variable for the degree of cleanness are getting smaller and smaller.

The desired lifespan of such storage media is as a rule five years. A necessary prerequisite for meeting this lifespan requirement is that the interior of the drive must be permanently hermetically sealed off from the surrounding atmosphere even at the point of division between motor or shaft flange of the motor and base plate.

Otherwise, due to atmospheric pressure fluctuations there can be an air change and hence uncontrolled pollution or particle contamination of the interior of the hard disks. For this reason, in drives with drop-in motors, that is, motors which are installed in the base plate only after equipment with the disk pack, elastically deformable sealing elements are provided in the joint region between fixed shaft and base plate. In this case the motor shaft which is extended axially downwards and externally threaded is provided with a flange which is collar-like above the base plate. Due to the nut screwed onto the thread from the outside, to the sealing element located between collar and base plate is applied a force under whose influence the sealing element is elastically deformed and in the process compressed in an axial direction.

The electrical connection for driving the motor is here made by a connector which is located in the outwardly opening shaft end of the motor and which consists of a cylindrical insulating body through which pass contact pins arranged with parallel axes. The electrical connection between the contact pins and the terminal wires of the windings is made by a flexible printed circuit board, referred to as a FPC for short below. This FPC extends from the centre of the shaft radially outwards into the stator region. On the FPC are conductor strips which in the central region above the insulating body are soldered to the inner ends of the contact pins.

In the radially outer region, below the windings mounted on the bundle of laminations, the FPC is crescent-shaped or half-ring-shaped. In this region are provided solder pads on which the terminal wires of the windings are soldered. These solder pads in turn are connected by conductor strips on the FPC to the solder pads provided in the central region and designed for connection of the contact pins.

A solution described in this way was disclosed in U.S. Pat. No. 5,661,352.

A drawback of this solution is that the radially outwardly extending FPC crosses the sealing surface provided on the collar. Hence the sealing surface in the crossing region is lowered by the material thickness of the FPC, step-like junctions being formed on both sides of the FPC. "Hermetic" sealing by the sealing element located between sealing surface and stop face on the base plate is no longer possible owing to the suddenly varying compression rate of the elastic sealing element in the step region, because two radially oriented capillary gaps by which an exchange of atmospheric volume is made possible are formed in this case.

SUMMARY OF THE INVENTION

It is therefore the object of the present invention to produce a seal which on the one hand causes hermetic sealing of the interior of the hard disk from the external atmosphere, especially from the interior of the spindle motor, and on the other hand without extra expenditure allows a conductive connection for the terminals of the spindle motor through the seal.

With the present invention, the formation of capillary gaps and the associated drawbacks are eliminated by the fact that the FPC is provided with a self-contained annular region which is preferably arranged roughly concentrically and which by means of a preferably self-adhesive film layer of roughly the same contour is glued onto the supporting surface of the shaft collar. This self-contained annular surface is extended radially inwards, that is, in a direction towards the centre of the annular surface, by at least one tongue-shaped region on which are arranged the conductor strips needed for contacting. These conductor strips are provided with solder pads to which are soldered the contact pins of the centrally arranged connector, which pins pass through the plastic body. From the contour facing away from the centre of the annular region is provided at least one radially outwardly directed, strip-like projection which ends in a half-ring-shaped to ring-shaped, roughly concentrically arranged region which serves to connect the winding wires coming from the motor windings. Here the winding wires are soldered to corresponding solder pads which are electrically connected by conductor strips to the corresponding solder terminals at the centre.

Due to this construction of the FPC according to the invention, in particular due to the roughly annular self-contained region which is glued to the supporting surface of the shaft collar preferably over the whole area, a step-free peripheral sealing surface without sudden changes of level is formed, so that a sealing element installed when the motor is assembled undergoes the same compression at every point all round. Since on the other hand the rear side of the FPC in said region is glued to the supporting surface of the shaft collar over the whole area by the film-like adhesive layer provided according to the invention, hermetically sealing assembly of the motor in the base plate is ensured.

The present invention therefore solves the problem of the exchange of volume at least at the junction between motor and base plate, which is triggered by atmospheric pressure fluctuations and caused by inadequate sealing of the clean-space region of the disk drive, in which are arranged the storage media with the associated read/write heads. Thus later contamination of the clean-space region by particles from the polluted ambient atmosphere in this junction region is prevented.

The annular construction of the FPC in the central area, and gluing of this area over the whole surface on the rear side to the supporting surface formed on the shaft flange, produce a plane, self-contained, step-free sealing surface which allows uniform compression of the elastic sealing element, for example an O-ring, and prevents in particular radially oriented capillary gaps from forming, so that the interior of the hard disk drive is permanently hermetically sealed off from the contaminated environment.

The construction according to the invention and gluing of the annular area of the FPC over the whole surface on the rear side therefore now ensure that pressure fluctuations of the atmosphere do not cause an exchange of volume and therefore can no longer contaminate the clean-space region of the drive even later.

BRIEF DESCRIPTION OF THE DRAWINGS

The present invention will now be described below with the aid of several particulars describing the invention in more detail, with reference to the attached graphic drawings. They show:

FIG. 2 a sectional view of a stator of a spindle motor;

FIG. 3 an insulating body with contact pins and the flexible printed circuit (FPC) constructed as a film, in a sectional view;

FIG. 4 the top view of the flexible printed circuit constructed as a film with conductor strips and solder pads and with the annular, sealing surface free from interruptions which is essential to the invention;

FIG. 5 the bottom view of the drawing according to FIG. 2.

DETAILED DESCRIPTION

Figure 1:
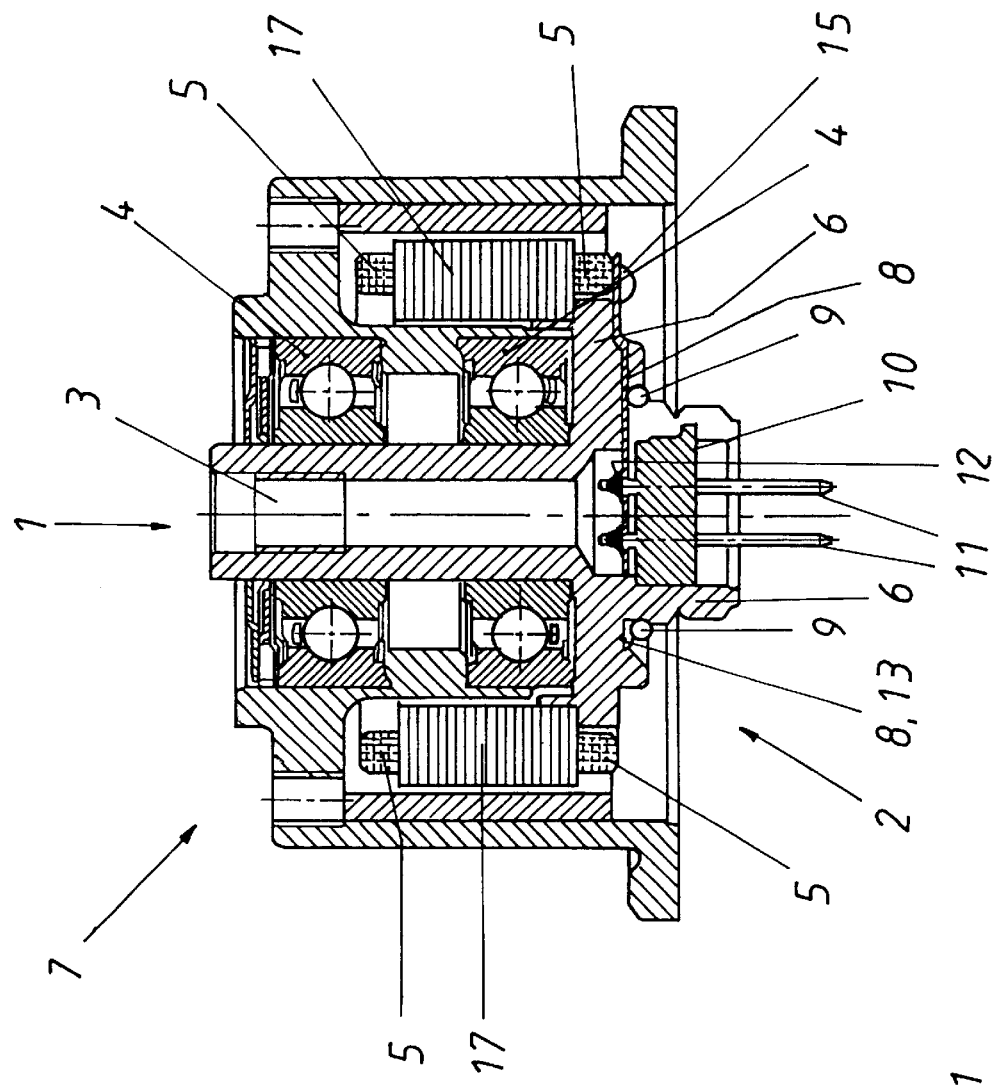
FIG. 1 a sectional view of a spindle motor.

FIG. 1 shows a spindle motor 1 which according to the invention has a sealing contacting means free from interruptions in the form of a sealing contact film (FPC) 8 for the stator windings 5 of the spindle motor 1 which is provided for installation in a base plate. The rotor 7 of the spindle motor 1 is aligned and mounted rotationally relative to the stator 2 by means of the bearings 4 arranged on the shaft 3. On the shaft flange 6 of the stator is mounted the bundle of laminations 17, with the associated windings 5. When a current is passed through these windings accordingly, magnetic fields are generated, which exert; on the multi-pole permanent magnets located in the rotor, forces under whose influence the torque required for the rotational movement is produced.

The FPC 8 essential to the invention, which combines two functions, namely sealing and contacting, is shown running horizontally towards the centre, beginning in broken lines below the right stator winding 5, this view showing that this FPC 8 extends into the centre of the vertical shaft 3 and the contact pins 11 pass approximately perpendicularly through the FPC 8. The connection between the contact pins 11 and the FPC 8 is made by solder connections 12. The result is a sealing and conducting, multi-pole connection starting from the centre of the shaft 3 into the interior of the spindle motor 1.

Below this FPC 8, in a central recess of the shaft 3 into which the FPC extends, is located the insulating body 10 in which the contact pins 11 are spaced apart from each other and insulated. This insulating body 10 fits in a central axial recess which also forms part of the shaft flange 6. Its radially outer side is adjoined radially by the O-ring 9. With its axially inwardly directed side the O-ring abuts against the FPC 8, and forms with the latter a peripheral sealing surface all round, formed without unevenness.

It is therefore important that the FPC 8 has a roughly annular, peripheral section all round which rests in plane fashion on the plane lower side of the shaft flange. For improved sealing, an adhesive layer 18 is located between the annular sealing surface 13 of the FPC 8 and the plane surface of the base flange which is preferably arranged on the rear side of the annular surface 13. Optionally, in addition an adhesive layer can also be applied to the front side against which the O-ring 9 abuts.

Due to the solution described in this way, it is now possible to achieve a seal which, without radial gaps which form as capillary gaps or cracks, provides a peripheral, step-free sealing surface located on the same level, which ensures uniform sealing all round without any interruption. Thus even in case of greater pressure differences, reliable sealing between the clean space and the ambient atmosphere outside the clean space can be achieved without there being an exchange of volume between the clean space and the external atmosphere through any capillary gaps.

The solder connections 12 cause an electrically conductive connection between the contact pins 11 and the solder pads 16 on the FPC 8, which are arranged within the central circular region of the FPC 8. In the present view there are four contact pins, of which however only two can be seen owing to the sectional view. These contact pins 11 are, as mentioned, soldered by the solder connections 12 to the associated solder pads 16 on the FPC 8 and electroconductively connected by conductor strips to the solder connections 15 which form the junctions between the solder pad 19 on the stator winding side of the sealing contact film and the terminal wire of the stator winding 5.

In the present view according to FIG. 1 is shown only one solder connection 15 which owing to the sectional view is arranged in this plane and shown in section. The other solder connections 15 on the stator winding side cannot be seen in the view according to FIG. 1. The conductive connection between solder connection 12 and solder connection 15 is designed as a conductor strip in the FPC 8.

The annular peripheral region of the FPC 8, which forms the sealing function as a sealing surface 13, is on its side facing towards the shaft flange 6 preferably provided with an adhesive layer with which the FPC 8 is attached to the shaft flange and sealed. This adhesive layer 18 therefore serves both for fixing and for sealing between the FPC 8 and the corresponding surface of the shaft flange 6. This ensures that no leaking point can occur between these two components, either radially or axially.

In FIG. 2 is shown the stator 2 of the spindle motor 1 in which is shown in turn according to the invention the FPC 8 arranged on its lower side. The essential components here are the vertical shaft 3, the insulating body 10, the FPC 8 and the electroconductive connections between contact pins 11 via the solder connections 12 and the conductor strips 14 which are formed in the FPC 8, towards the solder connections 15 on the stator winding side and the stator windings 5 electrically connected thereto.

In the view according to FIG. 2 the FPC 8 is shown without the O-ring 9, which is arranged in a groove of the shaft flange.

In the view according to FIG. 3 is shown an enlarged sectional view showing the insulating body 10 in which the contact pins 11 are arranged. The solder connections 12 here form the connection to the respective solder pads on the FPC 8, which are formed at the shaft end of the conductor strips 14. Also shown in this view are the two sectional surfaces of the adhesive layer 18.

In FIG. 4 is shown the top view of the layout according to FIG. 3. Here the portion of the FPC 8 which comes to lie on the insulating body 10 during assembly is formed centrally as a round portion. In the middle of this round region are shown four solder pads 16 through which extend the contact pins 11 which by means of the solder connections 12 make the connection to the conductor strips 14. Radially outside this inner round surface is provided a punched-out region in the FPC 8, ending at the sealing surface 13 which performs the function of sealing that is essential to the invention. Outside this region the FPC forms a crescent-shaped surface in which are located the solder pads 16 on the stator winding side, which via the solder connections 15 connect the stator windings 5 to the conductor strips 14.

In FIG. 5 is shown a bottom view of FIG. 2 in which the FPC described in FIG. 4 makes the connection between the contact pins 11 and the stator windings 5, the FPC 8 additionally showing the seal with its sealing surface 13 that is essential to the invention. At the outer circumference of this view is shown on the bundles of laminations 17 the layout of the stator windings 5. In the central region can be seen the insulating body 10 with the contact pins 11 arranged therein.

In a further embodiment of the present invention it is provided that the sealing element is sprayed onto the sealing surface 13 as an elastomeric sealing bead.

Legend to Drawings 1. spindle motor
2. stator
3. shaft
4. bearing
5. stator winding
6. shaft flange
7. rotor
8. FPC
9. O-ring
10. insulating body
11. contact pin
12. solder connection
13. sealing surface
14. conductor strip
15. solder connection
16. solder pad (inner)
17. bundle of laminations
18. adhesive layer
19. solder pad (outer)
20. punched-out region

What is claimed is:

1. A spindle motor for driving hard disk drives with sealing contacting means for the stator windings, comprising a stator with a vertical shaft having a shaft flange, stator windings, a flexible printed circuit board, an insulating body, contact pins and a rotor, wherein the flexible printed circuit board has a generally peripheral sealing surface all around, forming a counter surface for an elastic sealing element abutting against a base plate of the spindle motor.

2. A spindle motor according to claim 1, wherein the sealing surface is generally annular and has an adhesive layer on at least one of two sealing surfaces.

3. A spindle motor according to claim 2, wherein each of the sealing surfaces forms a peripheral, uniform level without steps.

4. A spindle motor according to claim 1, wherein the sealing element comprises an O-ring which abuts against the sealing surface opposite a contact face on a flange side.

5. A spindle motor according to claim 1, wherein the flexible printed circuit board has a central surface in which are formed solder connections for connecting conductor strips to the contact pins.

6. A spindle motor according to claim 1, wherein the flexible printed circuit board has a central surface in which are formed solder connections for connecting conductor strips to the contact pins.

7. A spindle motor according to claim 1, wherein the sealing element is sprayed onto the sealing surface as an elastomeric sealing bead.

\* \* \* \* \*